United States Patent
Heuer et al.

(10) Patent No.: US 10,676,613 B2
(45) Date of Patent: Jun. 9, 2020

(54) POYCARBONATE COMPOSITIONS CONTAINING ISOSORBIDE DIESTERS

(71) Applicant: Covestro Deutschland AG, Leverkusen (DE)

(72) Inventors: Helmut Werner Heuer, Siegen (DE); Rolf Wehrmann, Krefeld (DE); Anke Boumans, Goch (DE)

(73) Assignee: Covestro Deutschland AG, Leverkusen (DE)

(*) Notice: Subject to any disclaimer, the term of this patent is extended or adjusted under 35 U.S.C. 154(b) by 0 days.

(21) Appl. No.: 16/092,981

(22) PCT Filed: Apr. 13, 2017

(86) PCT No.: PCT/EP2017/058920
§ 371 (c)(1),
(2) Date: Oct. 11, 2018

(87) PCT Pub. No.: WO2017/178583
PCT Pub. Date: Oct. 19, 2017

(65) Prior Publication Data
US 2019/0136047 A1    May 9, 2019

(30) Foreign Application Priority Data

Apr. 14, 2016 (EP) .................................. 16165413

(51) Int. Cl.
| | | |
|---|---|---|
| *C08L 69/00* | (2006.01) | |
| *C08K 5/1535* | (2006.01) | |
| *C08K 5/50* | (2006.01) | |
| *C08K 5/00* | (2006.01) | |
| *B29C 48/00* | (2019.01) | |
| *C08G 64/06* | (2006.01) | |
| *C08K 5/524* | (2006.01) | |
| *B29K 69/00* | (2006.01) | |

(52) U.S. Cl.
CPC ............ *C08L 69/00* (2013.01); *B29C 48/022* (2019.02); *C08G 64/06* (2013.01); *C08K 5/00* (2013.01); *C08K 5/005* (2013.01); *C08K 5/1535* (2013.01); *C08K 5/50* (2013.01); *C08K 5/524* (2013.01); *B29K 2069/00* (2013.01); *C08L 2201/08* (2013.01); *C08L 2201/10* (2013.01); *C08L 2205/025* (2013.01)

(58) Field of Classification Search
CPC ....................................................... C08L 69/00
See application file for complete search history.

(56) References Cited

U.S. PATENT DOCUMENTS

| | | | |
|---|---|---|---|
| 2,991,273 A | 7/1961 | Hechelhammer et al. | |
| 2,999,825 A | 9/1961 | Floyd et al. | |
| 2,999,846 A | 9/1961 | Schnell et al. | |
| 3,028,365 A | 4/1962 | Schnell et al. | |
| 3,028,635 A | 4/1962 | Herubel | |
| 3,148,172 A | 9/1964 | Fox | |
| 3,271,367 A | 9/1966 | Schnell et al. | |
| 3,879,348 A | 4/1975 | Serini et al. | |
| 4,982,014 A | 1/1991 | Freitag et al. | |
| 5,132,154 A | 7/1992 | Westeppe et al. | |
| 5,227,458 A * | 7/1993 | Freitag .................. | B01D 71/50 428/412 |
| 5,288,778 A | 2/1994 | Schmitter et al. | |
| 5,821,380 A | 10/1998 | Holderbaum et al. | |
| 5,883,165 A | 3/1999 | Kröhnke et al. | |
| 8,258,325 B2 | 9/2012 | Grass et al. | |
| 9,617,457 B2 | 4/2017 | Sämisch et al. | |
| 2011/0195148 A1* | 8/2011 | Mentink ............ | C08G 18/6484 426/3 |
| 2012/0178858 A1 | 7/2012 | Wnuk et al. | |

FOREIGN PATENT DOCUMENTS

| | | |
|---|---|---|
| CN | 104212135 A | 12/2014 |
| DE | 1570703 A1 | 2/1970 |
| DE | 2036052 A1 | 1/1972 |
| DE | 2063050 A1 | 7/1972 |
| DE | 2211956 A1 | 10/1973 |
| DE | 3832396 A1 | 2/1990 |
| DE | 3918406 A1 | 12/1990 |
| DE | 102007006442 A2 | 8/2008 |
| DE | 102010002856 A1 | 9/2011 |
| EP | 0500496 A1 | 8/1992 |
| EP | 0839623 A1 | 5/1998 |
| FR | 1561518 A | 3/1969 |
| GB | 1122003 A | 7/1968 |
| GB | 1229482 A | 4/1971 |
| GB | 1367790 A | 9/1974 |
| JP | S6162040 A | 3/1986 |
| JP | S61062039 A | 3/1986 |
| JP | S61105550 A | 5/1986 |
| JP | 201178889 A | 4/2011 |
| WO | WO-9615102 A2 | 5/1996 |
| WO | WO-2015135958 A1 | 9/2015 |

OTHER PUBLICATIONS

International Search Report for PCT/EP2017/058920 dated Jul. 14, 2017.
Written Opinion of the International Searching Authority for PCT/EP2017/058920 dated Jul. 14, 2017.

* cited by examiner

*Primary Examiner* — Wenwen Cai

(74) *Attorney, Agent, or Firm* — Faegre Drinker Biddle & Reath LLP

(57) ABSTRACT

The invention relates to compositions containing polycarbonate and carboxylic acid esters of isosorbide, to the use of the compositions for the production of blends or shaped parts and to molded parts obtained therefrom. The compositions have improved rheological and optical properties and an improved demolding and processing behavior in the injection-molding process.

9 Claims, No Drawings

POLYCARBONATE COMPOSITIONS CONTAINING ISOSORBIDE DIESTERS

CROSS-REFERENCE TO RELATED APPLICATIONS

This application is a national stage application (under 35 U.S.C. § 371) of PCT/EP2017/058920, filed Apr. 13, 2017, which claims benefit of European Application No. 16165413.2, filed Apr. 14, 2016, both of which are incorporated herein by reference in their entirety.

The invention relates to compositions comprising polycarbonate and carboxylic esters of isosorbide, to the use of the compositions for production of blends or moldings, and to moldings obtainable therefrom. The compositions have improved rheological and optical properties, and improved demolding and processing characteristics in injection molding.

BACKGROUND OF THE INVENTION

Particularly in the case of thin-wall (housing) parts, for example for ultrabooks, smartphones or smartbooks, a low melt viscosity is required in order that components having a uniform wall thickness can be achieved. Further fields of application in which good flowabilities are required are in the automotive sector (for example headlamp covers, visors, optical fibre systems), in the electrics and electronics sector (lighting components, housing parts, covers, smart meter applications).

Bisphenol A diphosphate (BDP) is conventionally used for flow improvement, in amounts of up to more than 10 wt % in order to achieve the desired effect. However, this markedly reduces heat resistance. This effect is described, for example, in JP201178889 and WO 2015135958.

DE102010002856 describes the use of isosorbitol esters as plasticizers in laminated panes.

US20120178858 discloses an isosorbitol-containing plasticized starch.

However, there is no pointer to the effect of small amounts of isosorbide diesters on the rheological and optical properties of polycarbonates.

The prior art does not give the person skilled in the art any pointer as to how flowability and simultaneously the optical properties of polycarbonate compositions can be improved with virtually the same heat resistance.

The problem addressed was therefore that of finding compositions comprising aromatic polycarbonate compositions which have improved optical properties and simultaneously improved flowability combined with virtually the same heat resistance.

BRIEF SUMMARY OF THE INVENTION

It has been found that, surprisingly, polycarbonate compositions have improved flowability and better optical properties whenever particular amounts of isosorbide diesters are present. The heat resistance (Vicat temperature) remains virtually unchanged. At the same time, the coefficient of dynamic and static friction is reduced, which means better demolding and processing characteristics in injection molding.

The polycarbonate compositions to which the isosorbide diesters are added exhibit good melt stabilities with improved rheological properties, namely a higher melt volume flow rate (MVR) determined to DIN EN ISO 1133 (at a test temperature of 300° C., mass 1.2 kg), an improved melt viscosity determined to ISO 11443, and improved optical properties measurable by a lower yellowness index (YI) and/or a higher optical transmission, determined to ASTM E 313, compared to equivalent compositions otherwise comprising the same components save for the isosorbide diesters. The compositions further feature good mechanical properties, measurable by the notched impact resistance which is determined according to ISO 7391/180A.

DETAILED DESCRIPTION OF THE INVENTION

The present invention therefore provides compositions comprising A) 20.0 wt % to 99.95 wt % of aromatic polycarbonate and B) 0.05 wt % to 20.0 wt % of isosorbide diesters, with the proviso that, when the aromatic polycarbonate of component A) is one or more copolycarbonates containing at least the monomer units of the formula (1)

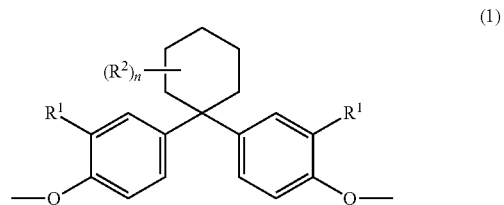

in which
$R^1$ is hydrogen or $C_1$-$C_4$-alkyl,
$R^2$ is $C_1$-$C_4$-alkyl, and
n is 0, 1, 2 or 3,
the composition comprises 0.05 to 7.5 wt % of component B).

The compositions preferably comprise
A) 20.0 wt % to 99.95 wt % of an aromatic polycarbonate,
B) 0.05 wt % to 20.0 wt % of isosorbide diesters,
C) 0.0% to 1.0 wt % of thermal stabilizer and
D) 0.0 wt % to 3.0 wt % of further additives,
with the proviso that, when the aromatic polycarbonate of component A) is one or more copolycarbonates containing at least the monomer units of the formula (1)

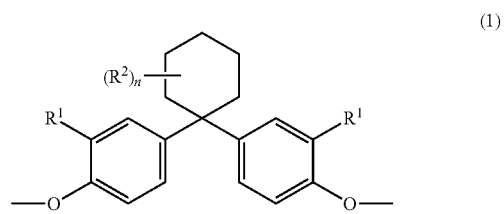

in which
$R^1$ is hydrogen or $C_1$-$C_4$-alkyl,
$R^2$ is $C_1$-$C_4$-alkyl, and
n is 0, 1, 2 or 3,
the composition comprises 0.05 to 7.5 wt % of component B).

More preferably, compositions of this kind consist of
A) 82.0 wt % to 99.95 wt % of aromatic polycarbonate,
B) 0.05 wt % to 15.0 wt % of isosorbide diesters,
C) 0.0 wt % to 1.0 wt % of thermal stabilizer and D) 0.0 wt % to 2.0 wt % of one or more further additives from the group of the antioxidants, demolding agents, flame retardants, UV absorbers, IR absorbers, antistats, optical brighteners, colourants from the group of the soluble organic pigments and additives for laser marking, with the proviso that, when the aromatic polycarbonate of component A) is one or more copolycarbonates containing at least the monomer units of the formula (I)

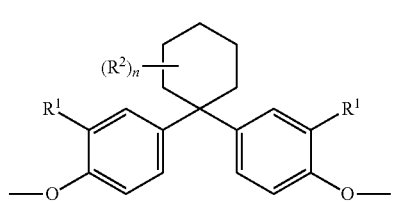

(1)

in which
$R^1$ is hydrogen or $C_1$-$C_4$-alkyl,
$R^2$ is $C_1$-$C_4$-alkyl, and
n is 0, 1, 2 or 3,
the composition comprises 0.05 to 7.5 wt % of component B).

In the context of the invention, the term "aromatic polycarbonate" is understood to mean both homopolycarbonates and copolycarbonates. These polycarbonates may be linear or branched in known fashion. According to the invention, mixtures of polycarbonates may also be used.

The compositions of the invention are preferably transparent.

The use of the isosorbide diesters in transparent polycarbonate compositions can improve the optical properties. Addition of the isosorbide diesters increases the transmittance, determined according to ISO 13468 at thickness 4 mm, and simultaneously lowers the yellowness index Y.I., determined according to ASTM E 313 (observer: 10°; illuminant: D65, on a test plaque of thickness 4 mm).

In the context of the invention, "transparent" means that the compositions have a transmittance in the range from 400 nm to 800 nm of at least 84%, determined according to ISO 13468 at a thickness of 4 mm, and a haze of <5%, determined according to ASTM 01003 at a layer thickness of 4 mm.

$C_1$-$C_4$-Alkyl in the context of the invention is, for example, methyl, ethyl, n-propyl, isopropyl, n-butyl, sec-butyl, tert-butyl, $C_1$-$C_6$-alkyl is also, for example, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-2-methylpropyl, $C_1$-$C_{10}$-alkyl is also, for example, n-heptyl and n-octyl, pinacyl, adamantyl, the isomeric menthyls, n-nonyl, n-decyl, and $C_1$-$C_{34}$-alkyl is also, for example, n-dodecyl, n-tridecyl, n-tetradecyl, n-hexadecyl or n-octadecyl. The same applies to the corresponding alkyl radical, for example in aralkyl/alkylaryl, alkylphenyl or alkylcarbonyl radicals. Alkylene radicals in the corresponding hydroxyalkyl or aralkyl/alkylaryl radicals are for example the alkylene radicals corresponding to the preceding alkyl radicals.

Aryl is a carbocyclic aromatic radical having 6 to 34 skeletal carbon atoms. The same applies to the aromatic moiety of an arylalkyl radical, also known as an aralkyl radical, and to aryl constituents of more complex groups, for example arylcarbonyl radicals.

Examples of $C_6$-$C_{34}$-aryl are phenyl, o-, p-, m-tolyl, naphthyl, phenanthrenyl, anthracenyl and fluorenyl.

Arylalkyl and aralkyl are each independently a straight-chain, cyclic, branched or unbranched alkyl radical as defined above, which may be mono-, poly- or persubstituted by aryl radicals as defined above.

In the context of the present invention—unless explicitly stated otherwise the stated wt % values for the components A, B, C and D are each based on the total weight of the composition. The composition may contain further components in addition to components A, B, C and D. In a preferred embodiment the composition comprises no further components and components A) to D) add up to 100 wt %, i.e. the composition consists of components A, B, C and D.

The compositions of the invention are preferably used for producing moldings. The compositions preferably have a melt volume flow rate (MVR) of 2 to 120 cm³/(10 min), more preferably of 3 to 90 cm³/(10 min) determined to ISO 1133 (test temperature 300° C., mass 1.2 kg).

The individual constituents of the compositions of the invention are more particularly elucidated hereinbelow:

Component A

The composition of the invention comprises, as component A, 20.0 wt % to 99.0 wt % of aromatic polycarbonate. The amount of the aromatic polycarbonate in the composition is preferably at least 50 wt %, more preferably at least 60 wt %, even more preferably at least 75 wt %, it being possible for a single polycarbonate or a mixture of two or more polycarbonates to be present.

The polycarbonates present in the compositions to which diglycerol ester is added to improve flowability are produced in known fashion from diphenols, carboxylic acid derivatives, optionally chain terminators and branching agents.

Particulars pertaining to the production of polycarbonates are disclosed in many patent documents spanning approximately the last 40 years. Reference may be made here to Schnell, "Chemistry and Physics of Polycarbonates", Polymer Reviews, Volume 9, interscience Publishers, New York, London, Sydney 1964, to D. Freitag, U. Grigo, P. R. Müller, H. Nouvertné, BAYER AG, "Polycarbonates" in Encyclopedia of Polymer Science and Engineering, Volume 11, Second Edition, 1988, pages 648-718 and finally to U. Grigo, K. Kirchner and P. R. Müller "Polycarbonate" [Polycarbonates] in Becker/Braun, Kunststoff-Handbuch [Plastics Handbook], volume 3/1, Polycarbonate, Polyacetale, Polyester, Celluloseester [Polycarbonates, Polyacetals, Polyesters, Cellulose Esters], Carl Hamer Verlag Munich, Vienna 1992, pages 117-299.

Aromatic polycarbonates are produced for example by reaction of diphenols with carbonyl halides, preferably phosgene, and/or with aromatic dicarbonyl dihalides, preferably benzenedicarbonyl dihalides, by the interfacial process, optionally with use of chain terminators and optionally with use of trifunctional or more than trifunctional branching agents. Production via a melt polymerization process by reaction of diphenols with diphenyl carbonate, for example, is likewise possible.

Examples of diphenols suitable for the production of polycarbonates include hydroquinone, resorcinol, dihydroxydiphenyls, bis(hydroxyphenypl)alkanes, bis(hydroxyphenyl)cycloalkanes, bis(hydroxyphenyl) sulfides, bis(hydroxyphenyl) ethers, bis(hydroxyphenyl) ketones, bis (hydroxyphenyl) sulfones, bis(hydroxyphenyl) sulfoxides, bis(hydroxyphenyl)diisopropylbenzenes, phthalimidines derived from derivatives of isatin or phenolphthalein and the ring-alkylated, ring-arylated and ring-halogenated compounds thereof.

Preferred diphenols are 4,4'-dihydroxydiphenyl, 2,2-bis (4-hydroxyphenyl)propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl) propane (dimethyl bisphenol A), bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane and also the bisphenols (I) to (III)

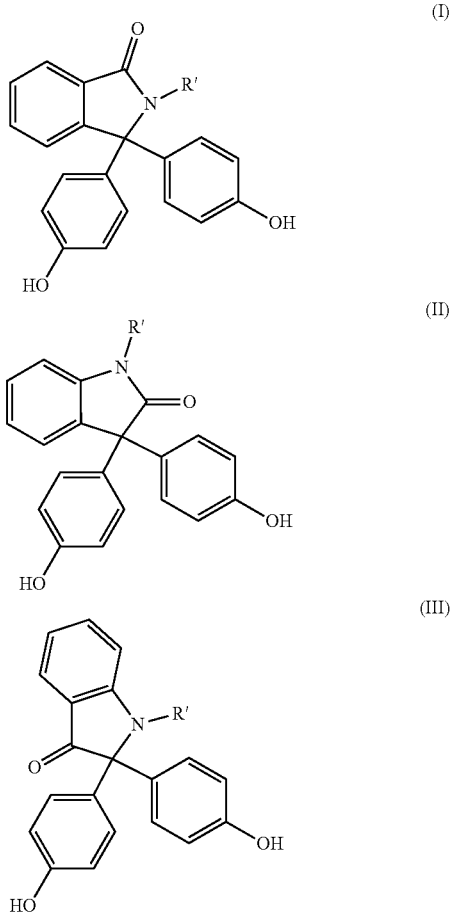

in which R' in each case is $C_1$-$C_4$-alkyl, aralkyl or aryl, preferably methyl or phenyl, most preferably methyl.

Particularly preferred diphenols are 2,2-bis(4-hydroxyphenyl)propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane and dimethylbisphenol A and also the diphenols of formulae (I), (II) and (III).

These and other suitable diphenols are described for example in U.S. Pat. Nos. 3,028,635, 2,999,825, 3,148,172, 2,991,273, 3,271,367, 4,982,014 and 2,999,846, in DE-A 1 570 703, DE-A 2063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and also in JP-A 62039/1986, JP-A 62040/1986 and JP-A 105550/1986.

In the case of homopolycarbonates only one diphenol is employed and in the case of copolycarbonates two or more diphenols are employed.

Suitable carbonic acid derivatives are for example phosgene and diphenyl carbonate.

Suitable chain terminators that may be employed in the production of polycarbonates are monophenols. Suitable monophenols are for example phenol itself, alkylphenols such as cresols, p-tert-butylphenol, cumylphenol and mixtures thereof.

Preferred chain terminators are the phenols mono- or polysubstituted by linear or branched $C_1$- to $C_{30}$-alkyl radicals, preferably unsubstituted or substituted by Certbutyl. Particularly preferred chain terminators are phenol, cumylphenyl and/or p-tert-butylphenol.

The amount of chain terminator to be employed is preferably 0.1 to 5 mol % based on the moles of diphenols employed in each case. The chain terminators can be added before, during or after the reaction with a carbonic acid derivative.

Suitable branching agents are the trifunctional or more than trifunctional compounds known in polycarbonate chemistry, in particular those having three or more than three phenolic OH groups.

Suitable branching agents are for example 1,3,5-tri(4-hydroxyphenyl)benzene, 1,1,1-tri(4-hydroxyphenyl)ethane, tri(4-hydroxyphenyl)phenylmethane, 2,4-bis(4-hydroxyphenylisopropyl)phenol, 2,6-bis(2-hydroxy-5'-methylbenzyl)-4-methylphenol 2-(4-hydroxyphenyl)-2-(2,4-dihydroxyphenyl)propane, tetra(4-hydroxyphenyl)methane, tetra (4-(4-hydroxyphenylisopropyl)phenoxy)methane and 1,4-bis((4',4''-dihydroxytriphenyl)methyl)benzene and 3,3-bis (3-methyl-4-hydroxyphenyl)-2-oxo-2,3-dihydroindole.

The amount of the branching agents for optional employment is preferably from 0.05 mol % to 2.00 mol % based on moles of diphenols used in each case.

The branching agents can either be initially charged with the diphenols and the chain terminators in the aqueous alkaline phase or added dissolved in an organic solvent before the phosgenation. In the case of the transesterification process the branching agents are employed together with the diphenols.

Particularly preferred polycarbonates are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane and also homo- or copolycarbonates derived from the diphenols of formulae (I), (II) and (III)

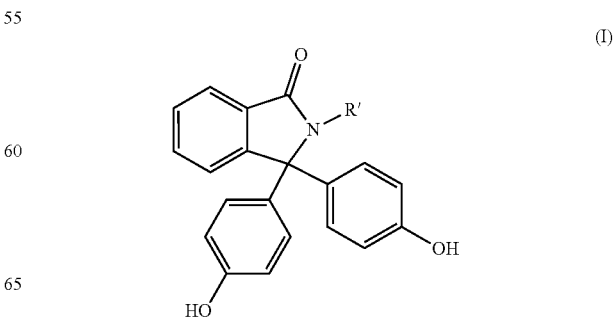

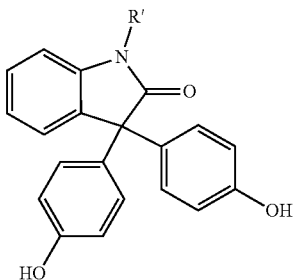
(II)

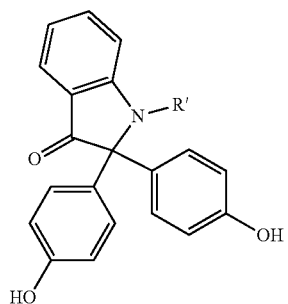
(III)

in which R' in each case is $C_1$-$C_4$-alkyl, aralkyl or aryl, preferably methyl or phenyl, most preferably methyl, preferably with bisphenol A as comonomer.

To achieve incorporation of additives component A is preferably employed in the form of powders, pellets or mixtures of powders and pellets.

The polycarbonate employed may also be a mixture of different polycarbonates, for example of the polycarbonates A1 and A2:

The amount of the aromatic polycarbonate A1 based on the total amount of polycarbonate is from 25.0 to 85.0 wt %, preferably from 28.0 to 84.0 wt %, particularly preferably from 30.0 to 83.0 wt %, wherein this aromatic polycarbonate is based on bisphenol A with a preferred melt volume flow rate MVR of 7 to 15 cm³/10 min, more preferably a melt volume flow rate MVR of 8 to 12 cm³/10 min and particularly preferably with a melt volume flow rate MVR of 8 to 11 cm³/10 min, determined according to ISO 1133 (test temperature 300° C., mass 1.2 kg).

The amount of pulverulent aromatic polycarbonate. A2 relative to the overall amount of polycarbonate is from 3.0 to 12.0 wt %, preferably from 4.0 to 11.0 wt % and more preferably from 3.0 to 10.0. wt %, and this aromatic polycarbonate is preferably based on bisphenol A with a preferred melt volume flow rate MVR of 3 to 8 cm³/10 min, more preferably a melt volume flow rate MVR of 4 to 7 cm³/10 min and yet more preferably a melt volume flow rate MVR of 6 cm³/10 min, determined according to ISO 1133 (test temperature 300° C., mass 1.2 kg).

In a preferred embodiment the composition comprises as component A a copolycarbonate comprising one or more monomer units of formula (1)

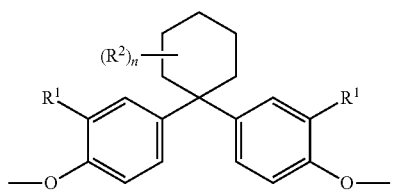
(1)

where
R¹ is hydrogen or $C_1$-$C_4$-alkyl, preferably hydrogen,
R² is $C_1$-$C_4$-alkyl, preferably methyl,
n is 0, 1, 2 or 3, preferably 3, and
optionally in combination with a further aromatic homo- or copolycarbonate containing one or more monomer units of the general formula (2)

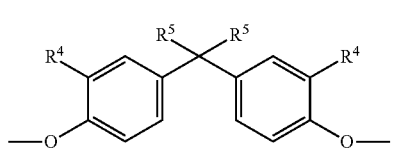
(2)

where
R⁴ is H, linear or branched $C_1$-$C_{10}$ alkyl, preferably linear or branched $C_1$-$C_6$ alkyl, particularly preferably linear or branched $C_1$-$C_4$ alkyl, very particularly preferably H or $C_1$-alkyl (methyl), and
R⁵ is linear or branched $C_1$-$C_{10}$ alkyl, preferably linear or branched $C_1$-$C_6$ alkyl, particularly preferably linear or branched $C_1$-$C_4$ alkyl, very particularly preferably $C_1$-alkyl (methyl);

and where the further homo- or copolycarbonate which is optionally additional present does not include any monomer units of formula (1). In this embodiment, the composition of the invention comprises only 0.05 to 7.5 wt %, preferably 0.05 to 6 wt %, more preferably 0.05 to 5 wt % and most preferably 0.05 to 1 wt % of component B).

The monomer unit(s) of general formula (1) is/are introduced via one or more corresponding diphenols of general formula (1):

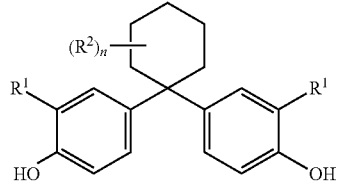
(1')

in which
R¹ is hydrogen or $C_1$-$C_4$-alkyl, preferably hydrogen,
R² is $C_1$-$C_4$-alkyl, preferably methyl, and
n is 0, 1, 2 or 3, preferably 3.

The diphenols of the formula (1') and the employment thereof in homopolycarbonates are disclosed in DE 3918406 for example.

Particular preference is given to 1,1-bis-(4-hydroxyphenyl)-3,3,5-trirnethylcyclohexane (bisphenol TMC) having the formula (1a):

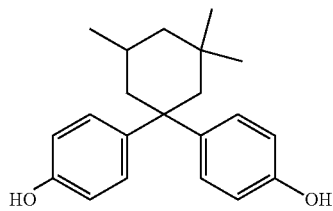

(1a)

In addition to one or more monomer units of formula (1) the copolycarbonate may include one or more monomer unit(s) of formula (3):

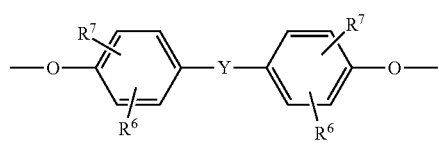

(3)

in which

R$^6$ and R$^7$ are independently H, C$_1$-C$_{18}$-alkoxy, halogen such as Cl or Br or respectively optionally substituted aryl or aralkyl, preferably H or C$_1$-C$_{12}$-alkyl, more preferably H or C$_1$-C$_8$-alkyl and most preferably H or methyl, and Y is a single bond, —SO$_2$—, —CO—, —O—, —S—, C$_1$-C$_6$-alkylene or C$_2$-C$_5$-alkylidene, and also C$_6$-C$_{12}$-arylene which may optionally be fused to further heteroatom-comprising aromatic rings.

The monomer unit(s) of general formula (3) is/are introduced via one or more corresponding diphenols of general formula (3a):

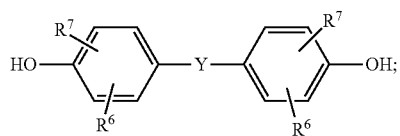

(3a)

where R$^6$, R$^7$ and Y are each as already defined in connection with formula (3).

Very particularly preferred diphenols of formula (3a) are diphenols of general formula (3b)

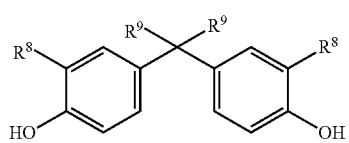

(3b)

in which R$^8$ is H, linear or branched C$_1$-C$_{10}$-alkyl, preferably linear or branched C$_1$-C$_6$-alkyl, more preferably linear or branched C$_1$-C$_4$-alkyl, most preferably H or C$_1$-alkyl (methyl), and in which R$^9$ is linear or branched C$_1$-C$_{10}$-alkyl, preferably linear or branched C$_1$-C$_6$-alkyl, more preferably linear or branched C$_1$-C$_4$-alkyl, most preferably C$_1$-alkyl (methyl).

Diphenol (3c) in particular is very particularly preferred here.

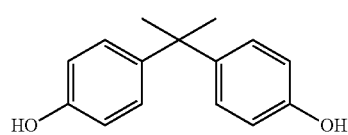

(3c)

The diphenols of the general formula (3a) may be used either alone or else in admixture with one another. The diphenols are known from the literature or producible by literature methods (see for example H. J. Buysch et al., Ullmann's Encyclopedia of industrial Chemistry, VCH, New York 1991, 5th ed., vol. 19, p. 348).

The total proportion of the monomer units of formula (1) in the copolycarbonate is preferably 0.1-88 mol %, more preferably 1-86 mol %, even more preferably 5-84 mol % and in particular 10-82 mol % (sum of the moles of diphenols of formula (1') based on the sum of the moles of all diphenols employed).

Copolycarbonates may be present in the form of block and random copolycarbonates. Random copolycarbonates are particularly preferred. The ratio of the frequency of the diphenoxide monomer units in the copolycarbonate is calculated from the molar ratio of the diphenols employed.

Monomer units of general formula (2) are introduced via a diphenol of general formula (2a):

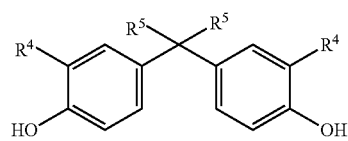

(2a)

in which R$^4$ is H, linear or branched C$_1$-C$_{10}$-alkyl, preferably linear or branched C$_1$-C$_6$-alkyl, more preferably linear or branched C$_1$-C$_4$-alkyl, most preferably H or C$_1$-alkyl (methyl), and in which R$^5$ is linear or branched C$_1$-C$_{10}$-alkyl, preferably linear or branched C$_1$-C$_6$-alkyl, more preferably linear or branched C$_1$-C$_4$-alkyl, most preferably C$_1$-alkyl (methyl).

Bisphenol A is very particularly preferred here.

In addition to one or more monomer units of general formulae (2) the homo- or copolycarbonate which is optionally present may contain one or more monomer units of formula (3) as already described for the copolycarbonate.

If the composition of the invention comprises copolycarbonate containing monomer units of formula (1), the total amount of copolycarbonate containing monomer units of formula (1) in the composition is preferably at least 3.0 wt %, more preferably at least 5.0 wt %.

In a preferred embodiment, the composition of the invention includes, as component A, a blend of the copolycarbonate comprising the monomer units of formula (1) and a bisphenol A-based homopolycarbonate.

if the composition of the invention includes copolycarbonate containing monomer units of formula (1), the total proportion of monomer units of formula (1) in component A is preferably 0.1-88 mol %, more preferably 1-86 mol %, even more preferably 5-84 mol % and in particular 10-82 mol %, based on the sum of the moles of all monomer units of formulae (1) and (3) in the one or more polycarbonates of component A.

In a preferred embodiment, the composition of the invention is characterized in that the amount of copolycarbonate containing the monomer units of the formula (1) in the composition is at least 20 wt %.

Component B

The compositions of the invention comprise, as component B, at least one isosorbide diester. The esters may also be based on different isomers of diglycerol. Esters based on various carboxylic acids are suitable. It is also possible to use mixtures instead of pure compounds.

The general formula of isosorbide which forms the basis for the isosorbide diesters used in accordance with the invention is as follows:

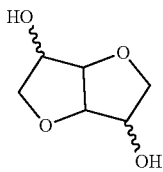

More preferably, the isosorbide diesters used in accordance with the invention are based on D-isosorbide, which has the following formula:

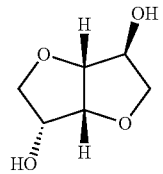

The isosorbide diesters present in the composition of the invention preferably derive from saturated or mono- or polyunsaturated monocarboxylic acids having a chain length from 4 to 30 carbon atoms.

Suitable monocarboxylic acids are, for example, caprylic acid ($C_7H_{15}COOH$, octanoic acid), capric acid ($C_9H_{19}COOH$, decanoic acid), lauric acid ($C_{11}H_{23}COOH$, dodecanoic acid), myristic acid ($C_{13}H_{27}COOH$, tetradecanoic acid), palmitic acid ($C_{16}H_{31}COOH$, hexadecanoic acid), margaric acid ($C_{16}H_{33}COOH$, heptadecanoic acid), stearic acid ($C_{17}H_{35}COOH$, octadecanoic acid), arachidic acid ($C_{19}H_{39}COOH$, eicosanoic acid), behenic acid ($C_{21}H_{43}COOH$, docosanoic acid), lignoceric acid ($C_{22}H_{47}COOH$, tetracosanoic acid), palmitoleic acid ($C_{15}H_{29}COOH$, (9Z)-hexadeca-9-enoic acid), petroselic acid ($C_{17}H_{33}COOH$, (6Z)-octadeca-6-enoic acid), (9Z)-octadeca-9-enoic acid), elaidic acid ($C_{17}H_{33}COOH$, (9E)-octadeca-9-enoic acid), linoleic acid ($C_{17}H_{31}COOH$, (9Z, 12Z)-octadeca-9,12-dienoic acid), alpha- and gamma-linolenic acid ($C_{17}H_{29}COOH$, (9Z,12Z,15Z)-octadeca-9,12, 15-trienoic acid and (6Z,9Z,12Z)-octadeca-6,9,12-trienoic acid), arachidonic acid ($C_{19}H_{31}COOH$, (5Z,8Z,11Z,14Z)-eicosa-5,8,11,14-tetraenoic acid), timnodonic acid ($C_{19}H_{29}COOH$, (5Z,8Z,11Z,14Z,17Z)-eicosa-5,8,11,14,17-pentaermic acid) and cervonic acid ($C_{21}H_{31}COOH$, (4Z,7Z, 10Z,13Z,16Z,19Z)-docosa-4,7,10,13,16,19-hexaenoic acid).

Particular preference is given to saturated aliphatic monocarboxylic acids having a chain length of 4 to 18 carbon atoms, more preferably having 6 to 16 carbon atoms and most preferably having 8 to 14 carbon atoms.

The isosorbide diesters may derive from one rnonocarboxylic acid or two different monocarboxylic acids. The isosorbide diesters may be present individually or in a mixture.

The isosorbide diesters present in the composition in accordance with the invention preferably have the general formula (IV)

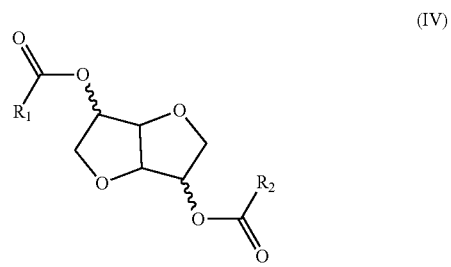

and derive from isosorbide, preferably D-isosorbide, and saturated or mono- or polyunsaturated monocarboxylic acids of the formulae $R_1$—COOH and $R_2$—COOH where $R_1$ and $R_2$ may be the same or different.

$R_1$ and $R_2$ are each preferably a saturated, branched or unbranched aliphatic radical of the formula $C_nH_{2n+1}$ or a Mono- or polyunsaturated, branched or unbranched aliphatic radical of the formula $C_nC_{2n-1}$, where n is a number from 3 to 29 and m is 1, 3, 5, 7, 9 or 11. Aliphatic radicals of the formula $C_nH_{2n-m}$ may be monounsaturated (m=1), diunsaturated (m=3), triunsaturated (m=5), tetraunsaturated (m=7), pentaunsaturated (n=9) or hexaunsaturated (m=11).

More preferably, n is a number from 3 to 17, even more preferably 5 to 15 and especially 7 to 13.

Unbranched alkyl radicals of the formula $C_nH_{2n+1}$ are, for example, n-propyl, n-butyl, n-pentyl, n-hexyl, n-heptyl, n-octyl, n-nonyl, n-decyl, n-dodecyl, n-tridecyl, n-tetralecyl, n-hexadecyl or n-octadecyl.

Suitable isosorbide diesters are, for example, those obtainable by esterification of isosorbide with caprylic, acid or decanoic acid or mixtures thereof, and mixtures thereof. These are commercially available, for example, from Roquette under the Polysorb ID37 or Polysorb ID46 trade name.

The polycarbonate compositions preferably contain 0.05 to 15.0 wt %, more preferably 0.1 to 10 wt %, of the isosorbide diesters. In one embodiment of the invention, the compositions of the invention contain 0.05 to 8.0 wt %, preferably 0.1 to 6.0 wt %, of isosorbide diesters.

Component C

Preferentially suitable heat stabilizers are triphenylphosphine, tris(2,4-di-tert-butylphenyl) phosphite (Irgafos® 168), tetrakis(2,4-di-tert-butylphenyl)-[1,1-biphenyl]-4,4'-diyl bisphosphonite, octadecyl-3-(3,5-di-cert-butyl-4-hydroxyphenyl) propionate (Irganox® 1076), bis(2,4-dicumylphenyl)pentaerythritol diphosphite (Doverphos® S-9228), bis(2,6-di-tert-butyl-4-methylphenyl)pentaerythritol diphosphite (AUK STAB PEP-36). Said heat stabilizers are employed alone or in admixture (for example Irganox® B900 (mixture of Irgafos® 168 and Irganox® 1076 in a 1:3 ratio) or Doverphos® S-9228 PC with Irganox® B900/

Irganox® 1076). The heat stabilizers are preferably employed in amounts of from 0.003 to 0.2 wt %.

Component D

Optionally present, in addition, are up to 2.0 wt %, preferably 0.01 to 2.0 wt %, of other conventional additives ("further additives"). The group of further additives does not include heat stabilizers since these have already been described above as component C.

Those additives that are customarily added to polycarbonates are especially the antioxidants, demolding agents, flame retardants, UV absorbers, IR absorbers, antistats, optical brighteners, light-scattering agents, colorants such as organic pigments, and/or additives for laser marking that are described in EP-A 0 839 623, WO-A 96/15102, EP-A 0 500 496 or "Plastics Additives Handbook", Hans Zweifel, 5th Edition 2000, Hanser Verlag, Munich, in the amounts customary for poly-carbonate. These additives may be added singly or else in admixture.

Preferred additives are specific UV stabilizers having minimum transmittance below 400 nm and maximum transmittance above 400 nm. Ultraviolet absorbers particularly suitable for use in the composition of the invention are benzotriazoles, triazines, benzophenones and/or arylated cyanoacrylates.

Particularly suitable ultraviolet absorbers are hydroxybenzotriazoles, such as 2-(3',5'-bis(1,1-dimethylbenzyl)-2'-hydroxyphenyl)benzotriazole (Tinuvin® 234, BASF, Ludwigshafen), 2-(2'-hydroxy-5'-(tert-octyl)phenyl)benzotriazole (Tinuvin® 329, BASF, Ludwigshafen), bis(3-(2H-benzotriazolyl)-2-hydroxy-5-tert-oxyl)methane (Tinuvin® 360, BASF, Ludwigshafen), 2-(4,6-diphenyl-1,3,5-triazin-2-yl)-5-(hexyloxy)phenol (Tinuvin® 1577, BASF, Ludwigshafen), and also benzophenones such as 2,4-dihydroxybenzophenone (Chimassorb® 22, BASF, Ludwigshafen) and 2-hydroxy-4-(octyloxy)benzophenone (Chimassorb® 81, BASF, Ludwigshafen), 2,2-bis[[(2-cyano-1-oxo-3,3-diphenyl-2-propenyl)oxy]methyl]-1,3-propanediyl ester (9CI) (Uvinul® 3030, BASF AG Ludwigshafen), 2-[2-hydroxy-4-(2-ethylhexyloxy]phenyl-4,6-di(4-phenyl)phenyl-1,3,5-triazine (Tinuvin® 1600, BASF, Ludwigshafen), tetraethyl 2,2'-(1,4-phenylenedimethylidene)bismaionate (Hostavin® B-Cap, Clariant AG) or N-(2-ethoxyphenyl)-N'-(2-ethylphenypethanediamide (Tinuvin® 312, CAS No. 23949-66-8, BASF, Ludwigshafen).

Particularly preferred specific UV stabilizers are Tinuvin® 360, Tinuvin® 329 and/or Tinuvin® 312, very particular preference being given to Tinuvin® 329 and Tinuvin® 360.

It is also possible to employ mixtures of these ultraviolet absorbers.

It is preferable when the composition comprises ultraviolet absorbers in an amount of up to 0.8 wt %, preferably 0.05 wt % to 0.5 wt % and more preferably 0.1 wt % to 0.4 wt %, based on the total composition.

The compositions of the invention may also comprise phosphates or sulfonate esters as transesterification stabilizers. It is preferable when triisooctyl phosphate is present as a transesterification stabilizer.

The composition may be free of mold release agents, for example GMS. The isosorbide diesters themselves act as demolding agents.

It is particularly preferable when the compositions comprise at least one heat stabilizer (component C) and optionally, as a further additive (component D), a transesterification stabilizer, in particular triisooctyl phosphate (TOF), or a UV absorber.

The compositions of the invention which comprise components A to D are produced by commonplace methods of incorporation by combining, mixing and homogenizing the individual constituents, the homogenization in particular preferably being carried out in the melt by application of shear forces. Combination and mixing is optionally effected prior to melt homogenization using powder pre-mixes.

It is also possible to employ pre-mixes of pellets or pellets and powders with the components B to D.

Also usable are pre-mixes formed from solutions of the mixing components in suitable solvents, in which case homogenization is optionally effected in solution and the solvent is thereafter removed.

In particular, components B to D of the composition of the invention are incorporable in the polycarbonate by familiar methods or as a masterbatch.

The use of masterbatches to incorporate the components B to D singly or as mixtures is preferable.

In this connection the composition of the invention can be combined, mixed, homogenized and subsequently extruded in customary apparatuses such as screw extruders (ZSK twin-screw extruders for example), kneaders or Brabender or Banbury mills. The extrudate can be cooled and comminuted after extrusion. It is also possible to premix individual components and then to add the remaining starting materials singly and/or likewise mixed.

The combining and commixing of a pre-mix in the melt may also be effected in the plasticizing unit of an injection molding machine. In this case, the melt is directly converted to a molded article in the subsequent step.

The compositions of the invention can be processed in a customary manner in standard machines, for example in extruders or injection molding machines, to give any molded articles, for example films, sheets or bottles.

Production of the moldings is preferably effected by injection molding, extrusion or solution in a casting process.

The compositions of the invention are suitable for producing multilayered systems. This comprises applying the polycarbonate composition in one or more layers atop a molded article made of a plastics material. Application may be carried out at the same time as or immediately after the molding of the molded article, for example by film insert molding, coextrusion or multicomponent injection molding. However, application may also be to the ready-molded main body, for example by lamination with a film, by encapsulative overmolding of an existing molded article or by coating from a solution.

The compositions of the invention are suitable for producing components in the automotive sector, for instance for bezels, headlight covers or frames, lenses and collimators or light guides and for producing frame components in the electricals and electronics (EE) and IT sectors, in particular for applications which impose stringent flowability requirements (thin layer applications). Such applications include, for example, screens or housings, for instance for ultrabooks or frames for LED display technologies, e.g. OLED displays or LCD displays or else for E-ink devices. Further applications are housing parts of mobile communication terminals, such as smartphones, tablets, ultrabooks, notebooks or laptops, but also satnavs, smartwatches or heart rate meters, and also electrical applications in thin-walled designs, for example home and industrial networking systems and smart meter housing components.

The molded articles and extrudates made of the compositions of the invention and also moldings, extrudates and multilayer systems comprising the compositions of the invention likewise form part of the subject matter of this application.

It is a particular feature of the compositions of the invention that they exhibit exceptional theological and optical properties and reduced coefficients of dynamic and static friction on account of their content of isosorbide diesters. A further advantage of the compositions of the invention is that it is possible to dispense with any additional demolding agent, for example PETS (pentaerythritol tetrastearate). These additives frequently lower the thermal properties. Therefore, the composition of the invention preferably does not comprise any pentaerythritol tetrastearate. The present invention therefore also provides for the use of one or more of the above-described isosorbide diesters for improving the optical transmission and/or for lowering the coefficients of dynamic and static friction of compositions comprising aromatic polycarbonate (component A), optionally heat stabilizer (component C) and optionally further additives (component D).

The embodiments described hereinabove for the composition of the invention also apply—where applicable—to the use of the invention.

The examples which follow are intended to illustrate the invention without, however, limiting said invention.

EXAMPLES

1. Description of Raw Materials and Test Methods

The polycarbonate compositions described in the following examples were produced on a Berstorff ZE 25 extruder at a throughput of 10 kg/h by compounding. The melt temperature was 275° C.

Component A-1: Linear polycarbonate based on bisphenol A having a melt volume flow rate MVR of 12.5 cm$^3$/10 min (as per ISO 1133, at a test temperature of 300° C. and 1.2 kg load), comprising triphenylphosphine as component C (heat stabilizer), produced by addition via a side extruder.

Component A-2: Linear polycarbonate based on bisphenol A having a melt volume flow rate MVR of 9.5 cm$^3$/10 min (as per ISO 1133, at a test temperature of 300° C. and 1.2 kg load), comprising triphenylphosphine as component C (heat stabilizer), produced by addition via a side extruder.

Component A-3: Linear polycarbonate powder based on bisphenol A having a melt volume flow rate MVR of 6 cm$^3$/10 min (as per ISO 1133 at a test temperature of 300° C. and 1.2 kg load).

Component A-4: Linear polycarbonate based on bisphenol A having a melt volume flow rate MVR of 32 cm$^3$/10 min (as per ISO 1133 at a test temperature of 300° C. and load 1.2 kg), comprising triphenylphosphine as component C (heat stabilizer), Tinuvin 329 as component D-2 (UV stabilizer) and glycerol monostearate as component D-3 (demolding agent), produced by addition via a side extruder.

Component A-5: Linear polycarbonate powder based on bisphenol A having a melt volume flow rate MVR of 19 cm$^3$/10 min((as per ISO 1133 at a test temperature of 300° C. and 1.2 kg load).

Component A-6: Copolycarbonate based on bisphenol A and bisphenol TMC having an MVR of 18 cm$^3$/10 min (330° C./2.16 kg) and a softening temperature (VST/B120) of 182° C. from Covestro AG, comprising triphenylphosphine as component C (heat stabilizer).

Component A-7: Branched polycarbonate based on bisphenol A having a melt volume flow rate MVR of 2 cm$^3$/10 min (as per ISO 1133 at a test temperature of 300° C. and 1.2 kg load).

Component B-1 Polysorb ID37 isosorbide diester from Roquette Freres.

Component B-2 Polysorb ID46 isosorbide diester from Roquette Freres.

Component C: triphenylphosphine from BASF

Component D-1: triisooctyl phosphate (TOF) from Lanxess AG

Component D-2: Tinuvin 329 from BASF

Component D-3: glycerol monostearate from Emery Oleochemicals, Loxstedt

Charpy notched impact resistance was measured at room temperature according to ISO 7391/180A on single-sidedly injected test specimens measuring 80 mm×10 mm×3 mm.

Vicat softening temperature VST/B50 was determined as a measure of heat distortion resistance in accordance with ISO 306 on test specimens measuring 80 mm×10 mm×4 mm with a 50 N ram loading and a heating rate of 50° C./h or of 120° C./h with a Coesfeld Eco 2920 instrument from Coesfeld Materialtest.

Melt volume flow rate (MVR) was determined in accordance with ISO 1133 (at a test temperature of 300° C., mass 1.2 kg or 2.16 kg) using a Zwick 4106 instrument from Zwick Roell. In addition MVR was measured after a preheating time of 20 minutes. This is a measure of melt stability under elevated thermal stress.

Yellowness index (Y.I.) was determined according to ASTM E 313 (observer: 10°/illuminant: D65) on specimen plaques having a sheet thickness of 4 mm.

Transmittance in the VIS range of the spectrum (400 nm to 800 nm) was determined to ISO 13468 on specimen plaques having a sheet thickness of 4 mm or 12 mm.

Haze was determined to ASTM D1003 on specimen plaques having a sheet thickness of 4 mm or 12 mm.

The specimen plaques were each produced by injection molding at the p a reported in the tables which follow.

Solution viscosity eta rel was determined according to ISO1628 with an Ubbelohde viscometer.

Shear viscosity (melt viscosity) was determined as per ISO 11443 with, a Göttfert Visco-Robo 45.00 instrument.

2. Compositions

TABLE 1

|  |  | 1 (Comp.) | 2 | 3 | 4 | 5 | 6 |
|---|---|---|---|---|---|---|---|
| Formulation: |  |  |  |  |  |  |  |
| A-1[1)] | wt % | 93 | 93 | 93 | 93 | 93 | 93 |
| A-3 | wt % | 7 | 6.9 | 6.8 | 6.6 | 6.4 | 6.2 |
| B-1 | wt % | — | 0.1 | 0.2 | 0.4 | 0.6 | 0.8 |

TABLE 1-continued

|  |  | 1 (Comp.) | 2 | 3 | 4 | 5 | 6 |
|---|---|---|---|---|---|---|---|
| Tests |  |  |  |  |  |  |  |
| MVR 7'/300° C./1.2 kg | ml/10 min | 11.7 | 11.9 | 12.3 | 12.8 | 13.3 | 13.4 |
| MVR 20'/300° C./1.2 kg | ml/10 min | 11.7 | 12 | 12.5 | 12.9 | 13.5 | 13.8 |
| Vicat VSTB 50 | ° C. | 145.5 | 144.8 | 143.9 | 142.9 | 141.14 | 140.5 |
| Melt visc. at 280° C. |  |  |  |  |  |  |  |
| eta 50 | Pa · s | 751 | 764 | 729 | 728 | 697 | 691 |
| eta 100 | Pa · s | 746 | 728 | 717 | 705 | 686 | 660 |
| eta 200 | Pa · s | 683 | 667 | 659 | 646 | 636 | 609 |
| eta 500 | Pa · s | 548 | 535 | 532 | 521 | 521 | 495 |
| eta 100 | Pa · s | 415 | 407 | 404 | 397 | 397 | 380 |
| eta 1500 | Pa · s | 336 | 331 | 328 | 322 | 321 | 310 |
| eta 5000 | Pa · s | 153 | 151 | 150 | 148 | 147 | 144 |
| Melt visc. at 300° C. |  |  |  |  |  |  |  |
| eta 50 | Pa · s | 412 | 416 | 406 | 382 | 384 | 361 |
| eta 100 | Pa · s | 403 | 407 | 397 | 373 | 375 | 357 |
| eta 200 | Pa · s | 381 | 384 | 377 | 356 | 356 | 338 |
| eta 500 | Pa · s | 327 | 329 | 324 | 306 | 306 | 293 |
| eta 1000 | Pa · s | 270 | 271 | 267 | 248 | 253 | 246 |
| eta 1500 | Pa · s | 230 | 232 | 228 | 213 | 218 | 212 |
| eta 5000 | Pa · s | 119 | 118 | 117 | 113 | 115 | 113 |
| Melt visc. at 320° C. |  |  |  |  |  |  |  |
| eta 100 | Pa · s | 221 | 222 | 212 | 199 | 193 | 202 |
| eta 200 | Pa · s | 216 | 211 | 206 | 195 | 188 | 194 |
| eta 500 | Pa · s | 197 | 196 | 189 | 177 | 173 | 180 |
| eta 1000 | Pa · s | 173 | 173 | 167 | 156 | 152 | 159 |
| eta 1500 | Pa · s | 155 | 151 | 149 | 140 | 137 | 142 |
| eta 5000 | Pa · s | 93 | 85 | 83 | 85 | 84 | 85 |
| Notched impact resistance ISO 7391/180A (3 mm) |  |  |  |  |  |  |  |
| 23° C. | kJ/m² | 64z | 64z | 65z | 64z | 64z | 66z |
| 0° C. | kJ/m² | — | — | — | — | 60z | 62z |
| −10° C. | kJ/m² | 57z | 58z | 59z | 57z | 5 × 59z<br>5 × 18s | 3 × 61z<br>7 × 16s |
| −20° C. | kJ/m² | 3 × 57z<br>7 × 20s | 7 × 55z<br>3 × 24s | 4 × 58z<br>6 × 19s | 2 × 61z<br>8 × 19s | 16s | 14s |
| −30° C. | kJ/m² | 16s | 16s | 15s | 16s | — | — |
| Impact resistance ISO180/1C 4 mm, 23° C. | kJ/m² | n.f. | n.f. | n.f. | n.f. | n.f. | n.f. |
| Optical properties 4 mm 290° C.[2] |  |  |  |  |  |  |  |
| Transmittance | % | 88.88 | 88.97 | 89.18 | 89.18 | 89.22 | 89.19 |
| Haze | % | 0.33 | 0.30 | 0.28 | 0.27 | 0.37 | 0.40 |
| Y.I. |  | 2.30 | 2.46 | 2.35 | 2.40 | 2.24 | 2.38 |
| 300° C.[2] |  |  |  |  |  |  |  |
| Transmittance | % | 88.91 | 88.98 | 89.18 | 89.11 | 89.23 | 89.22 |
| Haze | % | 0.33 | 0.36 | 0.23 | 0.25 | 0.28 | 0.31 |
| Y.I. |  | 2.28 | 2.44 | 2.32 | 2.41 | 2.23 | 2.34 |

[1] contains triphenylphosphine as component C;
[2] melt temperature in the injection molding process in the production of the test specimens;
n.f.: unfractured (no value, since no fracture)

Table 1 shows that inventive examples 2 to 6 have higher MVR values, lower melt viscosities and simultaneously improved optical properties compared to comparative example 1.

TABLE 2

|  |  | 7 (Comp.) | 8 | 9 | 10 | 11 |
|---|---|---|---|---|---|---|
| Formulation: |  |  |  |  |  |  |
| A-1[1] | wt % | 93 | 93 | 93 | 93 | 93 |
| A-3 | wt % | 6.99 | 6.79 | 6.59 | 6.39 | 6.19 |
| B-1 | wt % | — | 0.2 | 0.4 | 0.6 | 0.8 |
| D-1 | wt % | 0.01 | 0.01 | 0.01 | 0.01 | 0.01 |

TABLE 2-continued

|  |  | 7 (Comp.) | 8 | 9 | 10 | 11 |
|---|---|---|---|---|---|---|
| Tests |  |  |  |  |  |  |
| pellet eta rel |  | 1.278 | 1.279 | 1.278 | 1.278 | 1.277 |
| MVR 7'/300° C./1.2 kg | ml/10 min | 11.7 | 12.1 | 12.5 | 12.6 | 12.7 |
| Vicat VSTB 50 | ° C. | 145.1 | 143.9 | 143.3 | 142.6 | 142.1 |
| Melt viscosity |  |  |  |  |  |  |
| Melt visc. at 280° C. |  |  |  |  |  |  |
| eta 50 | Pa · s | 598 | 747 | 719 | 711 | 741 |
| eta 100 | Pa · s | 588 | 712 | 687 | 677 | 717 |
| eta 200 | Pa · s | 546 | 658 | 637 | 621 | 659 |
| eta 500 | Pa · s | 471 | 528 | 516 | 502 | 531 |
| eta 1000 | Pa · s | 396 | 406 | 397 | 384 | 404 |
| eta 1500 | Pa · s | 328 | 330 | 325 | 312 | 328 |
| eta 5000 | Pa · s | 151 | 152 | 150 | 145 | 151 |
| Melt visc. at 300° C. |  |  |  |  |  |  |
| eta 50 | Pa · s | 447 | 387 | 372 | 380 | 359 |
| eta 100 | Pa · s | 438 | 377 | 361 | 375 | 351 |
| eta 200 | Pa · s | 414 | 365 | 349 | 357 | 337 |
| eta 500 | Pa · s | 353 | 316 | 299 | 308 | 293 |
| eta 1000 | Pa · s | 289 | 262 | 246 | 256 | 246 |
| eta 1500 | Pa · s | 246 | 226 | 213 | 221 | 213 |
| eta 5000 | Pa · s | 125 | 118 | 112 | 116 | 114 |
| Melt visc. at 320° C. |  |  |  |  |  |  |
| eta 50 | Pa · s | 209 | 197 | 207 | 199 | 192 |
| eta 100 | Pa · s | 207 | 194 | 204 | 196 | 190 |
| eta 200 | Pa · s | 205 | 191 | 199 | 189 | 186 |
| eta 500 | Pa · s | 186 | 177 | 181 | 174 | 172 |
| eta 1000 | Pa · s | 163 | 157 | 159 | 153 | 152 |
| eta 1500 | Pa · s | 148 | 143 | 143 | 139 | 137 |
| eta 5000 | Pa · s | 90 | 88 | 87 | 85 | 85 |
| Notched impact resistance ISO 7391/180A (3 mm) |  |  |  |  |  |  |
| 23° C. | kJ/m$^2$ | 65z | 65z | 66z | 66z | 65z |
| −10° C. | kJ/m$^2$ | 57z | 58z | 60z | 59z | 60z |
| −20° C. | kJ/m$^2$ | 3 × 58z 7 × 19s | 2 × 56z 8 × 19s | 2 × 59z 8 × 19s | 2 × 36z 8 × 16s | 2 × 36z 8 × 18s |
| Impact resistance ISO180/1C 4 mm, 23° C. | kJ/m$^2$ | n.f. | n.f. | n.f. | n.f. | n.f. |
| Optical properties 4 mm |  |  |  |  |  |  |
| 290° C.[2)] |  |  |  |  |  |  |
| Transmittance | % | 88.97 | 89.13 | 89.24 | 89.17 | 89.18 |
| Haze | % | 0.57 | 0.32 | 0.22 | 0.28 | 0.26 |
| Y.I. |  | 2.55 | 2.43 | 2.29 | 2.36 | 2.48 |
| 300° C.[2)] |  |  |  |  |  |  |
| Transmittance | % | 89.12 | 89.17 | 89.28 | 89.18 | 89.19 |
| Haze | % | 0.36 | 0.26 | 0.24 | 0.24 | 0.27 |
| Y.I. |  | 2.38 | 2.39 | 2.22 | 2.36 | 2.49 |
| 300° C.[2)] 5 × VWZ[3)] |  |  |  |  |  |  |
| Transmittance | % | 89.13 | 89.17 | 89.23 | 89.15 | 89.23 |
| Haze | % | 0.45 | 0.33 | 0.32 | 0.30 | 0.33 |
| Y.I. |  | 2.50 | 2.47 | 2.40 | 2.56 | 2.53 |
| 320° C.[2)] |  |  |  |  |  |  |
| Transmittance | % | 89.12 | 89.25 | 89.18 | 88.96 | 89.31 |
| Haze | % | 0.35 | 0.29 | 0.27 | 0.32 | 0.25 |
| Y.I. |  | 2.54 | 2.25 | 2.47 | 2.71 | 2.30 |
| 320° C.[2)] 5 × DT[3)] |  |  |  |  |  |  |
| Transmittance | % | 89.08 | 89.17 | 89.20 | 89.12 | 89.27 |
| Haze | % | 0.42 | 0.34 | 0.34 | 0.35 | 0.40 |
| Y.I. |  | 2.50 | 2.44 | 2.63 | 2.80 | 2.58 |

[1)]contains triphenylphosphine as component C;
[2)]melt temperature in the injection molding process in the production of the test specimens;
[3)]5 × DT: 5 times the dwell time of the melt in the injection molding machine before the test specimen is injection-molded; single dwell time: 45 seconds;
n.f.: unfractured (no value, since no fracture)

Table 2 shows that inventive examples 8 to 11 have higher MVR values, lower melt viscosities and simultaneously improved optical properties compared to comparative example 7.

TABLE 3

|  |  | 12 (Comp.) | 13 | 14 | 15 | 16 | 17 |
|---|---|---|---|---|---|---|---|
| Formulation: | | | | | | | |
| A-2[1)] | wt % | 93 | 93 | 93 | 93 | 93 | 93 |
| A-3 | wt % | 7 | 6.9 | 6.8 | 6.6 | 6.4 | 6.2 |
| B-1 | wt % | — | 0.1 | 0.2 | 0.4 | 0.6 | 0.8 |
| Tests | | | | | | | |
| pellet eta rel | | 1.290 | 1.289 | 1.289 | 1.288 | 1.287 | 1.287 |
| MVR 7'/300° C./1.2 kg | ml/10 min | 8.7 | 9.0 | 9.2 | 9.6 | 10.0 | 10.1 |
| Vicat VSTB 50 | ° C. | 145.3 | 144.4 | 143.9 | 142.6 | 139.7 | 140.6 |
| Melt visc. at 280° C. | | | | | | | |
| eta 50 | Pa · s | 999 | 1010 | 969 | 965 | 910 | 870 |
| eta 100 | Pa · s | 921 | 935 | 888 | 890 | 840 | 805 |
| eta 200 | Pa · s | 816 | 832 | 790 | 784 | 742 | 714 |
| eta 500 | Pa · s | 630 | 636 | 610 | 601 | 574 | 552 |
| eta 1000 | Pa · s | 461 | 464 | 448 | 441 | 425 | 411 |
| eta 1500 | Pa · s | 367 | 368 | 357 | 352 | 340 | 332 |
| eta 5000 | Pa · s | 164 | 164 | 159 | 158 | 154 | 151 |
| Melt visc. at 300° C. | | | | | | | |
| eta 50 | Pa · s | 500 | 487 | 472 | 474 | 440 | 449 |
| eta 100 | Pa · s | 488 | 476 | 462 | 462 | 449 | 430 |
| eta 200 | Pa · s | 449 | 443 | 427 | 431 | 416 | 395 |
| eta 500 | Pa · s | 372 | 371 | 356 | 352 | 347 | 331 |
| eta 1000 | Pa · s | 299 | 298 | 287 | 285 | 280 | 269 |
| eta 1500 | Pa · s | 252 | 251 | 243 | 242 | 237 | 229 |
| eta 5000 | Pa · s | 125 | 126 | 123 | 122 | 120 | 110 |
| Melt visc. at 320° C. | | | | | | | |
| eta 50 | Pa · s | 250 | 255 | 275 | 271 | 232 | 241 |
| eta 100 | Pa · s | 245 | 251 | 266 | 264 | 232 | 233 |
| eta 200 | Pa · s | 242 | 241 | 257 | 256 | 221 | 221 |
| eta 500 | Pa · s | 210 | 211 | 225 | 223 | 195 | 197 |
| eta 1000 | Pa · s | 179 | 179 | 192 | 190 | 168 | 170 |
| eta 1500 | Pa · s | 150 | 148 | 169 | 168 | 150 | 152 |
| eta 5000 | Pa · s | 85 | 84 | 97 | 96 | 88 | 88 |
| Notched impact resistance ISO 7391/180A (3 mm) | | | | | | | |
| 23° C. | kJ/m$^2$ | 66z | 66z | 66z | 66z | 67z | 67z |
| 0° C. | kJ/m$^2$ | — | — | — | — | — | 63z |
| −10° C. | kJ/m$^2$ | — | — | — | — | — | 5 × 60z |
| | | | | | | | 5 × 17s |
| −20° C. | kJ/m$^2$ | 61z | 62z | 60z | 63z | 38z | 15s |
| −30° C. | kJ/m$^2$ | 1 × 54z | 15s | 15s | 15s | 14s | — |
| | | 9 × 16s | | | | | |
| Coefficient of friction | | | | | | | |
| Static friction | | 0.60 | 0.49 | 0.45 | 0.40 | 0.34 | 0.36 |
| Dynamic friction | | 0.56 | 0.49 | 0.45 | 0.41 | 0.36 | 0.37 |
| Impact resistance ISO180/1C 4 mm, 23° C. | kJ/m$^2$ | n.f. | n.f. | n.f. | n.f. | n.f. | n.f. |
| Optical properties 4 mm 280° C.[2)] | | | | | | | |
| Transmittance | % | 88.82 | 89.07 | 89.34 | 89.31 | 89.39 | 89.34 |
| Haze | % | 0.29 | 0.31 | 0.50 | 0.34 | 0.28 | 0.32 |
| Y.I. | | 2.30 | 2.14 | 1.99 | 2.04 | 1.96 | 2.02 |
| 300° C.[2)] | | | | | | | |
| Transmittance | % | 88.81 | 89.05 | 89.28 | 89.29 | 89.42 | 89.40 |
| Haze | % | 0.30 | 0.27 | 0.49 | 0.22 | 0.29 | 0.29 |
| Y.I. | | 2.43 | 2.17 | 2.11 | 2.07 | 2.04 | 1.96 |
| 300° C.[2)] 5 × DT[3)] | | | | | | | |
| Transmittance | % | 88.69 | 88.99 | 89.09 | 89.28 | 89.37 | 89.33 |
| Haze | % | 0.33 | 0.32 | 0.45 | 0.34 | 0.36 | 0.37 |
| Y.I. | | 2.47 | 2.35 | 2.21 | 2.23 | 2.28 | 2.27 |

TABLE 3-continued

|  |  | 12 (Comp.) | 13 | 14 | 15 | 16 | 17 |
|---|---|---|---|---|---|---|---|
| 320° C.[2] | | | | | | | |
| Transmittance | % | 88.76 | 89.08 | 89.36 | 89.23 | 89.38 | 89.38 |
| Haze | % | 0.29 | 0.30 | 0.29 | 0.65 | 0.28 | 0.29 |
| Y.I. | | 2.39 | 2.18 | 2.04 | 2.42 | 2.23 | 2.15 |
| 320° C.[2] 5 × DT[3] | | | | | | | |
| Transmittance | % | 88.67 | 89.04 | 89.32 | 88.89 | 89.39 | 89.38 |
| Haze | % | 0.53 | 0.29 | 0.37 | 0.31 | 0.35 | 0.41 |
| Y.I. | | 2.45 | 2.40 | 2.18 | 2.61 | 2.51 | 2.46 |

[1]contains triphenylphosphine as component C;
[2]melt temperature in the injection molding process in the production of the test specimens;
[3]5 × DT: 5 times the dwell time of the melt in the injection molding machine before the test specimen is injection-molded;
single dwell time: 45 seconds;
n.f.: unfractured (no value, since no fracture)

Table 3 shows that inventive examples 13 to 17 have higher MVR values, lower melt viscosities and simultaneously improved optical properties compared to comparative example 12. At the same time, examples 13 to 17 have reduced coefficients of static and dynamic friction compared to comparative example 12.

TABLE 4

|  |  | 18 (Comp.) | 19 | 20 | 21 | 22 |
|---|---|---|---|---|---|---|
| Formulation: | | | | | | |
| A-2[1] | wt % | 93 | 93 | 93 | 93 | 93 |
| A-3 | wt % | 6.99 | 6.79 | 6.59 | 6.39 | 6.19 |
| B-1 | wt % | — | 0.2 | 0.4 | 0.6 | 0.8 |
| D-1 | wt % | 0.01 | 0.01 | 0.01 | 0.01 | 0.01 |
| Tests | | | | | | |
| pellet eta rel | | 1.289 | 1.289 | 1.288 | 1.287 | 1.286 |
| MVR 7'/300° C./1.2 kg | ml/10 min | 9.2 | 9.3 | 9.5 | 9.9 | 10.3 |
| Vicat VSTB 50 | ° C. | 145.4 | 143.4 | 142.6 | 140.7 | 139.6 |
| Melt visc. at 280° C. | | | | | | |
| eta 50 | Pa · s | 888 | 874 | 718 | 757 | 721 |
| eta 100 | Pa · s | 832 | 826 | 676 | 713 | 685 |
| eta 200 | Pa · s | 748 | 731 | 641 | 647 | 631 |
| eta 500 | Pa · s | 594 | 567 | 570 | 518 | 510 |
| eta 1000 | Pa · s | 447 | 404 | 421 | 397 | 394 |
| eta 1500 | Pa · s | 360 | 294 | 369 | 324 | 322 |
| eta 5000 | Pa · s | 163 | 145 | 159 | 150 | 149 |
| Melt visc. at 300° C. | | | | | | |
| eta 50 | Pa · s | 441 | 405 | 413 | 395 | 381 |
| eta 100 | Pa · s | 429 | 393 | 397 | 378 | 369 |
| eta 200 | Pa · s | 402 | 373 | 378 | 355 | 345 |
| eta 500 | Pa · s | 344 | 321 | 325 | 306 | 298 |
| eta 1000 | Pa · s | 283 | 267 | 270 | 255 | 250 |
| eta 1500 | Pa · s | 242 | 230 | 232 | 220 | 217 |
| eta 5000 | Pa · s | 120 | 110 | 120 | 116 | 116 |
| Melt visc. at 320° C. | | | | | | |
| eta 50 | Pa · s | 230 | 236 | 235 | 214 | 222 |
| eta 100 | Pa · s | 228 | 231 | 230 | 207 | 220 |
| eta 200 | Pa · s | 227 | 227 | 223 | 205 | 213 |
| eta 500 | Pa · s | 203 | 204 | 200 | 187 | 192 |
| eta 1000 | Pa · s | 175 | 177 | 173 | 163 | 168 |
| eta 1500 | Pa · s | 157 | 159 | 156 | 147 | 150 |
| eta 5000 | Pa · s | 92 | 94 | 93 | 85 | 90 |
| Notched impact resistance ISO 7391/180A (3 mm) | | | | | | |
| 23° C. | kJ/m² | 65z | 67z | 67z | 66z | 67z |
| 0° C. | kJ/m² | — | — | 64z | 62z | 61z |
| −10° C. | kJ/m² | 62z | 60z | 7 × 58z 3 × 21s | 6 × 60z 4 × 17s | 2 × 60z 8 × 17s |
| −20° C. | kJ/m² | 6 × 59z 4 × 19s | 2 × 54z 8 × 18s | 17s | 15s | 14s |
| −30° C. | kJ/m² | 16s | 15s | — | — | — |
| Impact resistance | kJ/m² | n.f. | n.f. | n.f. | n.f. | n.f. |

TABLE 4-continued

|  |  | 18 (Comp.) | 19 | 20 | 21 | 22 |
|---|---|---|---|---|---|---|
| ISO180/1C |  |  |  |  |  |  |
| Friction characteristics |  |  |  |  |  |  |
| Static friction |  | 0.52 | 0.39 | 0.35 | 0.33 | 0.32 |
| Dynamic friction |  | 0.5 | 0.4 | 0.36 | 0.34 | 0.33 |
| Optical properties 4 mm |  |  |  |  |  |  |
| 280° C.[2)] |  |  |  |  |  |  |
| Transmittance | % | 89.38 | 89.42 | 89.44 | 89.40 | 89.49 |
| Haze | % | 0.30 | 0.28 | 0.27 | 0.37 | 0.34 |
| Y.I. |  | 2.12 | 1.93 | 1.93 | 1.96 | 1.93 |
| 300° C.[2)] |  |  |  |  |  |  |
| Transmittance | % | 89.18 | 89.39 | 89.37 | 89.54 | 89.44 |
| Haze | % | 0.38 | 0.32 | 0.34 | 0.30 | 0.39 |
| Y.I. |  | 2.56 | 2.10 | 1.96 | 1.91 | 2.05 |
| 300° C.[2)] 5 × DT[3)] |  |  |  |  |  |  |
| Transmittance | % | 89.32 | 89.30 | 89.42 | 89.41 | 89.30 |
| Haze | % | 0.35 | 0.38 | 0.29 | 0.30 | 0.35 |
| Y.I. |  | 2.19 | 2.17 | 2.16 | 2.25 | 2.37 |
| 320° C.[2)] |  |  |  |  |  |  |
| Transmittance | % | 89.25 | 89.36 | 89.42 | 89.41 | 89.52 |
| Haze | % | 0.45 | 0.29 | 0.34 | 0.36 | 0.44 |
| Y.I. |  | 2.29 | 2.13 | 1.84 | 2.34 | 1.95 |
| 320° C.[2)] 5 × DT[3)] |  |  |  |  |  |  |
| Transmittance | % | 88.74 | 89.37 | 89.39 | 89.38 | 89.35 |
| Haze | % | 1.51 | 0.40 | 0.37 | 0.38 | 0.40 |
| Y.I. |  | 2.14 | 2.26 | 2.15 | 2.27 | 2.61 |

[1)]contains triphenylphosphine as component C;
[2)]melt temperature in the injection molding process in the production of the test specimens;
[3)]5 × DT: 5 times the dwell time of the melt in the injection molding machine before the test specimen is injection-molded; single dwell time: 45 seconds;
n.f.: unfractured (no value, since no fracture)

Table 4 shows that inventive examples 19 to 22 have higher MVR values, lower melt viscosities and simultaneously improved optical properties compared to comparative example 18. At the same time, examples 19 to 22 have reduced coefficients of static and dynamic friction compared to comparative example 18.

TABLE 5

|  |  | 23 (Comp.) | 24 | 25 | 26 |
|---|---|---|---|---|---|
| Formulation |  |  |  |  |  |
| A-4[1)] | wt % | 93.00 | 93.00 | 93.00 | 93.00 |
| A-5 | wt % | 7.00 | 6.79 | 6.59 | 6.39 |
| B-2 | wt % | — | 0.20 | 0.40 | 0.60 |
| D-1 | wt % | — | 0.01 | 0.01 | 0.01 |
| Tests: |  |  |  |  |  |
| pellet eta rel |  | 1.231 | 1.231 | 1.229 | 1.230 |
| MVR 300° C./1.2 kg | ml/10 min | 31.2 | 32.9 | 33.3 | 35.0 |
| Vicat VSTB50 | ° C. | 143.9 | 142.3 | 140.6 | 139.1 |
| Melt visc. at 260° C. |  |  |  |  |  |
| eta 50 | Pa · s | 612 | 570 | 565 | 533 |
| eta 100 | Pa · s | 593 | 564 | 556 | 525 |
| eta 200 | Pa · s | 573 | 551 | 539 | 515 |
| eta 500 | Pa · s | 491 | 475 | 466 | 442 |
| eta 1000 | Pa · s | 387 | 378 | 370 | 355 |
| eta 1500 | Pa · s | 317 | 310 | 304 | 295 |
| eta 5000 | Pa · s | 147 | 144 | 142 | 139 |
| Melt visc. at 280° C. |  |  |  |  |  |
| eta 50 | Pa · s | 240 | 223 | 251 | 241 |
| eta 100 | Pa · s | 236 | 217 | 249 | 240 |
| eta 200 | Pa · s | 228 | 205 | 247 | 239 |
| eta 500 | Pa · s | 222 | 191 | 234 | 230 |
| eta 1000 | Pa · s | 180 | 166 | 207 | 202 |
| eta 1500 | Pa · s | 162 | 148 | 184 | 179 |
| eta 5000 | Pa · s | 100 | 93 | 104 | 101 |
| Melt visc. at 300° C. |  |  |  |  |  |
| eta 50 | Pa · s | 144 | 132 | 135 | 130 |
| eta 100 | Pa · s | 142 | 129 | 132 | 128 |
| eta 200 | Pa · s | 139 | 124 | 129 | 125 |
| eta 500 | Pa · s | 133 | 120 | 126 | 122 |
| eta 1000 | Pa · s | 117 | 113 | 115 | 116 |
| eta 1500 | Pa · s | 106 | 97 | 105 | 103 |
| eta 5000 | Pa · s | 74 | 71 | 66 | 71 |
| Optical data 4 mm |  |  |  |  |  |
| 280° C.[2)] |  |  |  |  |  |
| Transmittance | % | 87.61 | 88.34 | 88.78 | 88.81 |
| Haze | % | 1.79 | 0.84 | 0.51 | 0.41 |
| Y.I. |  | 1.06 | 0.73 | 0.60 | 0.62 |
| Optical data 12 mm |  |  |  |  |  |
| 280° C.[2)] |  |  |  |  |  |
| Transmittance | % | 82.49 | 85.34 | 86.08 | 86.19 |
| Haze | % | 6.53 | 2.85 | 1.85 | 1.74 |
| Y.I. |  | 2.40 | 1.30 | 1.03 | 1.00 |

[1)]contains triphenylphosphine as component C and Tinuvin 329 as component D-2 and glycerol monostearate as component D-3;
[2)]melt temperature in the injection molding process in the production of the test specimens.

Table 5 shows that inventive examples 24 to 26 have higher MVR values, lower melt viscosities and simultaneously improved optical properties compared to comparative example 23.

TABLE 6

| | | 27 (Comp.) | 28 | 29 | 30 |
|---|---|---|---|---|---|
| Formulation | | | | | |
| A-6[1] | wt % | 93.00 | 93.00 | 93.00 | 93.00 |
| A-3 | wt % | 7.00 | 6.79 | 6.59 | 6.39 |
| B-2 | wt % | — | 0.20 | 0.40 | 0.60 |
| D-1 | wt % | — | 0.01 | 0.01 | 0.01 |
| Tests: | | | | | |
| pellet eta rel | | 1.292 | 1.290 | 1.289 | 1.288 |
| MVR 330° C./2.16 kg | ml/10 min | 9.6 | 10.3 | 10.8 | 11.0 |
| IMVR20' 330° C./2.16 kg | ml/10 min | 9.8 | 10.8 | 12.0 | 11.6 |
| Delta MVR/IMVR20' | | 0.2 | 0.5 | 1.2 | 0.6 |
| Melt visc. at 300° C. | | | | | |
| eta 50 | Pa · s | 2161 | 1953 | 1908 | 1792 |
| eta 100 | Pa · s | 1948 | 1778 | 1736 | 1643 |
| eta 200 | Pa · s | 1653 | 1516 | 1478 | 1408 |
| eta 500 | Pa · s | 1104 | 1025 | 1001 | 963 |
| eta 1000 | Pa · s | 746 | 696 | 675 | 652 |
| eta 1500 | Pa · s | 572 | 536 | 523 | 505 |
| eta 5000 | Pa · s | 250 | 234 | 234 | 225 |
| Melt visc. at 320° C. | | | | | |
| eta 50 | Pa · s | 1140 | 972 | 934 | 890 |
| eta 100 | Pa · s | 1068 | 911 | 878 | 849 |
| eta 200 | Pa · s | 960 | 818 | 787 | 768 |
| eta 500 | Pa · s | 712 | 632 | 608 | 601 |
| eta 1000 | Pa · s | 501 | 459 | 441 | 439 |
| eta 1500 | Pa · s | 392 | 364 | 350 | 349 |
| eta 5000 | Pa · s | 172 | 164 | 159 | 157 |
| Melt visc. at 330° C. | | | | | |
| eta 50 | Pa · s | 813 | 646 | 646 | 603 |
| eta 100 | Pa · s | 741 | 624 | 610 | 559 |
| eta 200 | Pa · s | 687 | 582 | 563 | 523 |
| eta 500 | Pa · s | 552 | 477 | 461 | 433 |
| eta 1000 | Pa · s | 411 | 366 | 356 | 338 |
| eta 1500 | Pa · s | 330 | 299 | 291 | 278 |
| eta 5000 | Pa · s | 152 | 141 | 138 | 133 |
| Melt visc. at 340° C. | | | | | |
| eta 50 | Pa · s | 589 | 433 | 416 | 403 |
| eta 100 | Pa · s | 560 | 425 | 407 | 398 |
| eta 200 | Pa · s | 530 | 406 | 391 | 380 |
| eta 500 | Pa · s | 444 | 350 | 337 | 333 |
| eta 1000 | Pa · s | 347 | 284 | 274 | 273 |
| eta 1500 | Pa · s | 285 | 240 | 232 | 232 |
| eta 5000 | Pa · s | 135 | 119 | 117 | 117 |
| Melt visc. at 360° C. | | | | | |
| eta 50 | Pa · s | 286 | 214 | 196 | 196 |
| eta 100 | Pa · s | 285 | 219 | 204 | 201 |
| eta 200 | Pa · s | 283 | 219 | 202 | 199 |
| eta 500 | Pa · s | 258 | 204 | 188 | 186 |
| eta 1000 | Pa · s | 220 | 179 | 166 | 165 |
| eta 1500 | Pa · s | 192 | 160 | 149 | 150 |
| eta 5000 | Pa · s | 103 | 91 | 87 | 87 |
| Vicat VSTB 120 | ° C. | 181.8 | 180.1 | 178.9 | 176.1 |
| Optical data 330° C.[2] | | | | | |
| Transmittance | % | 88.38 | 88.87 | 88.59 | 88.74 |
| Y.I. | | 5.16 | 4.43 | 5.50 | 4.87 |
| Haze | % | 0.64 | 0.56 | 0.56 | 0.51 |
| 360° C.[2] | | | | | |
| Transmittance | % | 88.49 | 88.77 | 88.69 | 88.80 |
| Y.I. | | 4.67 | 4.60 | 4.96 | 4.87 |
| Haze | % | 0.56 | 0.58 | 0.55 | 0.53 |

[1] contains triphenylphosphine as component C;
[2] melt temperature in the injection molding process in the production of the test specimens The results show that the inventive copolycarbonate compositions of examples 28-30 have very good melt stability (MVR or IMVR).

Addition of the isosorbide diester distinctly improves flowability compared to comparative example 27, This is true of various temperatures and of the entire shear range (melt viscosities).

At the same time, the optical properties are improved, which is manifested in higher optical transmission compared to comparative example 27.

TABLE 7

|  |  | 31 (comp.) | 32 | 33 (comp.) |
|---|---|---|---|---|
| A-6[1] | wt % | 100 | 95 | 90 |
| Polysorb ID 46 | wt % |  | 5 | 10 |
| Results |  |  |  |  |
| pellet eta rel |  | 1.253 | 1.239 | 1.225 |
| specimen eta rel |  | 1.251 | 1.238 | 1.224 |
| MVR 330° C./2.16 kg | cm³/10 min | 15.4 | 40.3 | 107.3 |
| Vicat VSTB 50 | ° C. | 182.5 | 143.3 | 116.9 |
| Vicat VSTB 120 | ° C. | 183.7 | 145.1 | 119.3 |
| Optical properties 4 mm, 330° C.[2] |  |  |  |  |
| Transmittance |  | 88.69 | 89.10 | 87.74 |

[1] contains triphenylphosphine as component C;
[2] melt temperature in the injection molding process in the production of the test specimens The results in Table 7 show that it is possible to increase optical transmission with 5 wt % of isosorbide diester, but higher amounts have an adverse effect on transmittance. It can further be seen that heat distortion resistance decreases significantly with high amounts of isosorbide diester.

TABLE 8

| Formulation |  | 34 (comp.) | 35 | 36 | 37 |
|---|---|---|---|---|---|
| A-7 | % | 93.00 | 93.00 | 93.00 | 93.00 |
| A-3 | % | 6.99 | 6.79 | 6.59 | 6.39 |
| B-1 | % | — | 0.20 | 0.40 | 0.60 |
| D-1 | % | 0.01 | 0.01 | 0.01 | 0.01 |
| Tests: |  | -1 | -2 | -3 | -4 |
| MVR 300° C./1.2 kg | ml/10 min | 2.5 | 2.5 | 2.5 | 2.6 |
| IMVR20' 300° C./1.2 kg | ml/10 min | 2.6 | 2.5 | 2.6 | 2.6 |
| Delta MVR/IMVR20' |  | 0.1 | 0.0 | 0.1 | 0.0 |
| Vicat VSTB50 | ° C. | 149.2 | 147.4 | 146.5 | 145.6 |
| Melt visc. @ 300° C. |  |  |  |  |  |
| eta 50 | Pas | 2656 | 2556 | 2566 | 2598 |
| eta 100 | Pas | 1230 | 1177 | 1186 | 1105 |
| eta 200 | Pas | 976 | 989 | 1003 | 932 |
| eta 500 | Pas | 574 | 577 | 584 | 545 |
| eta 1000 | Pas | 421 | 421 | 426 | 399 |
| eta 1500 | Pas | 340 | 340 | 345 | 323 |
| eta 5000 | Pas | 159 | 180 | 161 | 151 |
| Melt visc. @ 320° C. |  |  |  |  |  |
| eta 50 | Pas | 1184 | 1175 | 897 | 865 |
| eta 100 | Pas | 794 | 794 | 708 | 692 |
| eta 200 | Pas | 645 | 681 | 649 | 640 |
| eta 500 | Pas | 403 | 411 | 401 | 397 |
| eta 1000 | Pas | 309 | 315 | 304 | 303 |
| eta 1500 | Pas | 257 | 263 | 251 | 252 |
| eta 5000 | Pas | 128 | 131 | 126 | 126 |

TABLE 8-continued

| Optical data 12 mm |  |  |  |  |  |
|---|---|---|---|---|---|
| Transmittance | % | 75.85 | 77.34 | 77.06 | 77.03 |
| YI |  | 12.05 | 9.76 | 10.93 | 11.96 |
| Haze | % | 3.11 | 1.79 | 2.43 | 1.92 |

The results in table 8 show that the inventive polycarbonate compositions of examples 35-37 have very good melt stability (MVR or IMVR).

The optical properties are distinctly improved, which is manifested in a higher optical transmission and lower yellowness index YI compared to comparative example 34.

Addition of the isosorbide diester distinctly improves flowability compared to comparative example 34. This is true of various temperatures and of low shear rates, which is particularly important for extrusion.

The invention claimed is:

1. A composition consisting of the following components:
   A) 82.0 wt % to 99.95 wt % of aromatic polycarbonate,
   B) 0.05 wt % to 15.0 wt % of isosorbide diesters,
   C) 0.0 wt % to 1.0 wt % of thermal stabilizer and
   D) 0.0 wt % to 2.0 wt % of one or more further additives selected from the group consisting of antioxidants, demolding agents, flame retardants, UV absorbers, IR absorbers, antistats, optical brighteners, and colourants,
   with the proviso that, when the aromatic polycarbonate of component A) is one or more copolycarbonates containing at least the monomer units of the formula (1)

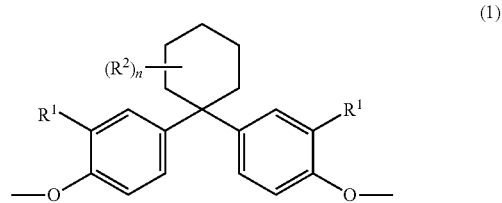

(1)

in which
R[1] is hydrogen or $C_1$-$C_4$-alkyl,
R[2] is $C_1$-$C_4$-alkyl, and
n is 0, 1, 2 or 3,
the composition comprises 0.05 to 7.5 wt % of component B).

2. The composition as claimed in claim 1, wherein the isosorbide diesters are derived from one or more saturated or unsaturated monocarboxylic acids having a chain length of 4 to 30 carbon atoms.

3. The composition as claimed in claim 1, wherein the isosorbide diesters have the general formula (I)

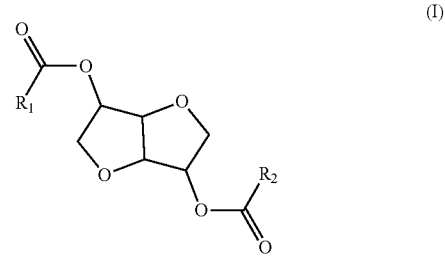

(I)

where $R_1$ and $R_2$ are each independently a saturated, branched or unbranched aliphatic radical of the formula $C_nH_{2n+1}$ or a mono- or polyunsaturated, branched or unbranched aliphatic radical of the formula $C_nH_{2n-m}$, where n is a number from 3 to 29 and m is 1, 3, 5, 7, 9 or 11.

4. The composition as claimed in claim 1, wherein the isosorbide diester is derived from at least one carboxylic acid selected from the group consisting of caprylic acid, capric acid, lauric acid, myristic acid, palmitic acid, margaric acid, stearic acid, arachidic acid, behenic acid, lignoceric acid, palmitoleic acid, petroselic acid, oleic acid, elaidic acid, linoleic acid, linolenic acid, arachidonic acid, timnodonic acid and cervonic acid.

5. A molding, an extrudate or a multilayer system comprising the composition as claimed in claim 1.

6. A composition comprising
A) 20.0 wt % to 99.95 wt % of a blend of a copolycarbonate containing monomer units of the formula (1) and a bisphenol A homopolycarbonate
B) 0.05 wt % to 7.5 wt % of isosorbide diesters,

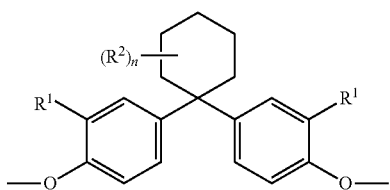

(1)

in which
$R^1$ is hydrogen or $C_1$-$C_4$-alkyl,
$R^2$ is $C_1$-$C_4$-alkyl, and
n is 0, 1, 2 or 3,
wherein the composition has a transmittance in the range from 400 nm to 800 nm of at least 84%, determined according to ISO 13468 at a thickness of 4 mm, and a haze of <5%, determined according to ASTM D1003 at a layer thickness of 4 mm.

7. The composition as claimed in claim 6, wherein the composition optionally comprises a further aromatic homo- or copolycarbonate containing one or more monomer units of the general formula (2)

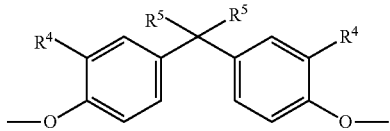

(2)

in which
$R^4$ is H or linear or branched $C_1$-$C_{10}$ alkyl, and
R5 is linear or branched C1-C10 alkyl;
where the further homo- or copolycarbonate does not have any monomer units of the formula (1).

8. The composition as claimed in claim 7, wherein the copolycarbonate containing monomer units of the formula (1) comprises 0.1-88 mol % of monomer units of the formula (1a) based on the sum total of the diphenol monomer units present in the copolycarbonate containing monomer units of the formula (1)

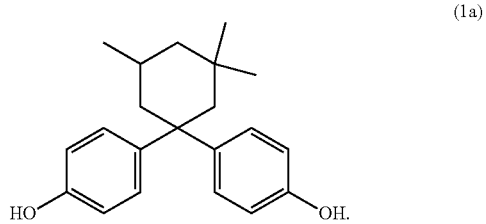

(1a)

9. The composition as claimed in claim 7, wherein the copolycarbonate containing the monomer units of the formula (1) additionally contains monomer units of the formula (3)

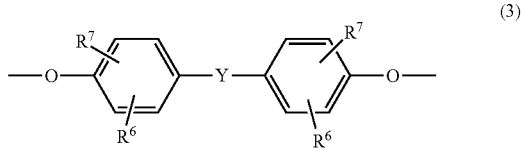

(3)

in which
$R^6$ and $R^7$ are independently H, $C_1$-$C_{18}$-alkyl, $C_1$-$C_{18}$-alkoxy, halogen or in each case optionally substituted aryl or aralkyl, and
Y is a single bond, —$SO_2$—, —CO—, —O—, —S—, $C_1$-$C_6$-alkylene, $C_2$-$C_5$-alkylidene, or $C_6$-$C_{12}$-arylene which may optionally be fused to further heteroatom-comprising aromatic rings.

* * * * *